UNITED STATES PATENT OFFICE.

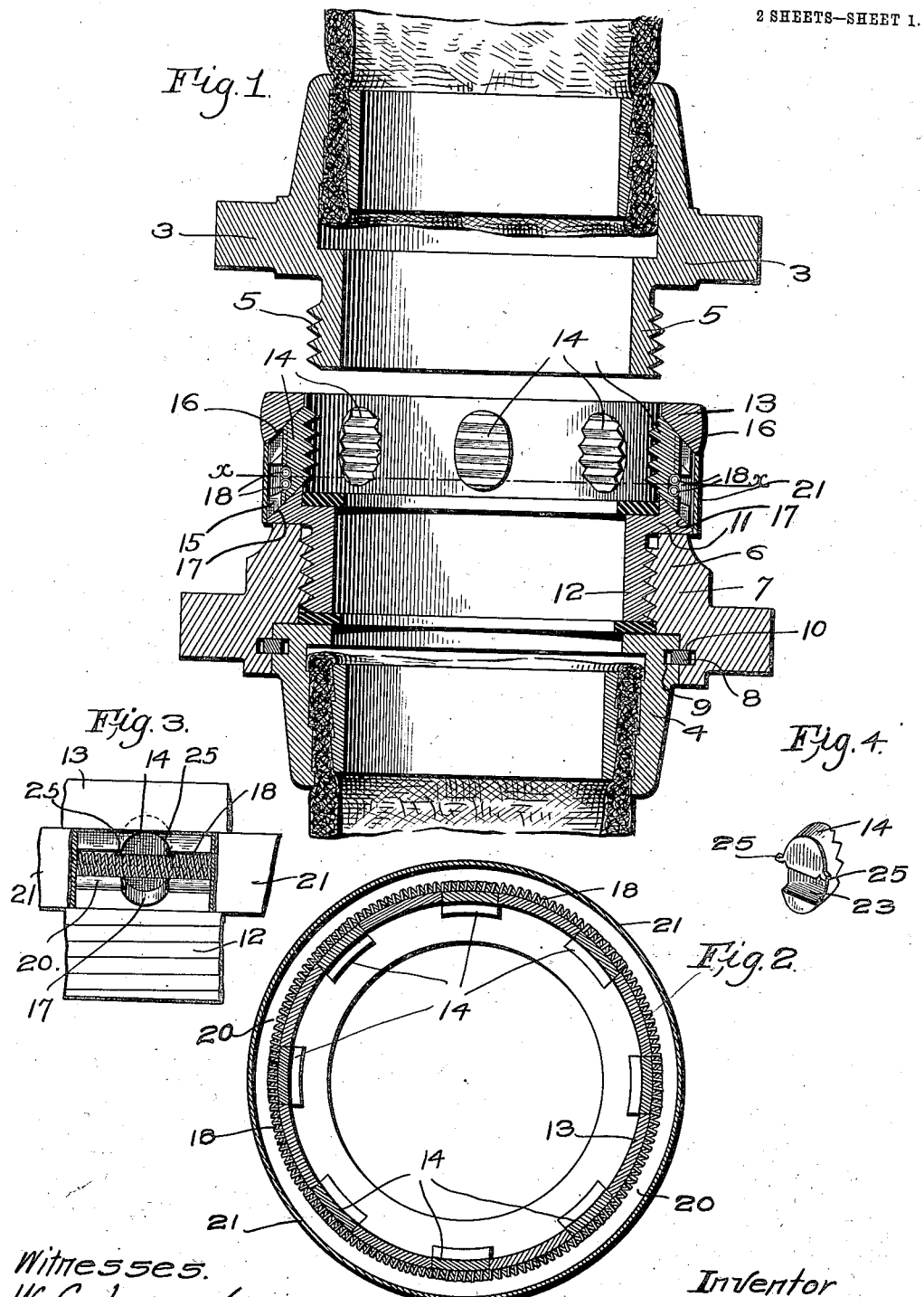

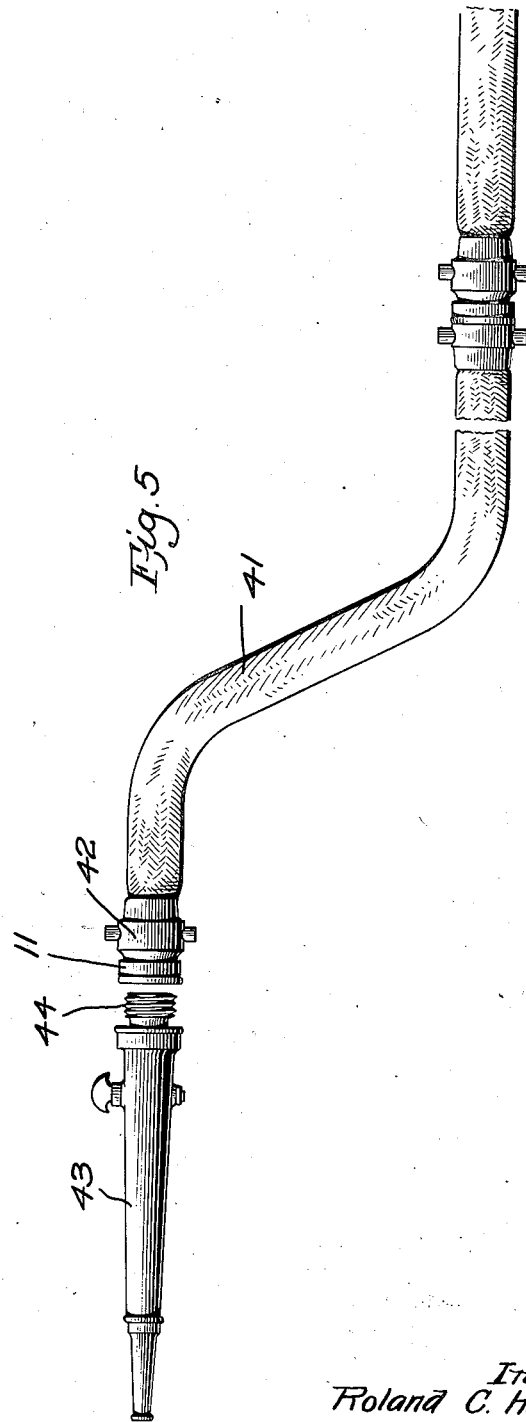

ROLAND C. HILTON, OF QUINCY, MASSACHUSETTS, ASSIGNOR, BY MESNE ASSIGNMENTS, TO HILTON COUPLING COMPANY, OF BOSTON, MASSACHUSETTS, A CORPORATION OF MAINE.

COUPLING ATTACHMENT.

No. 906,135.      Specification of Letters Patent.      Patented Dec. 8, 1908.

Application filed September 16, 1907. Serial No. 393,052.

*To all whom it may concern:*

Be it known that I, ROLAND C. HILTON, a citizen of the United States, residing at Quincy, county of Norfolk, and State of Massachusetts, have invented an Improvement in Coupling Attachments, of which the following description, in connection with the accompanying drawing, is a specification, like letters on the drawing representing like parts.

This invention relates to couplings for hose, pipes, conduits, hydrants, etc., and has for one of its objects to provide a novel attachment which can be used with an ordinary coupling thereby to convert it into one which may be coupled simply by a longitudinal movement of the members relative to each other, thus avoiding the necessity of screwing the two members of the coupling together; and for another object to provide a novel quick-acting coupling which has such a construction that when the two members are coupled together any tendency to separate the coupling members will tend to more securely lock them together.

Couplings for hose and pipes as now commonly made comprise a male and a female member, the male member having exterior screw-threads to screw into the interior screw threads of the female member; and the coupling together of the two members thus made requires more or less time dependent upon the time taken to screw said members together. It is also customary to provide for connecting fire hose to hydrants by making the hydrant with a male or exteriorly screw threaded member which is adapted to screw into the female member of the coupling; and to provide for coupling nozzles to fire hose by providing the nozzle with a screw threaded male member which is adapted to screw into the female member of a coupling on the hose.

The act of coupling the hose to the hydrant, or of coupling a nozzle to a hose, involves the screwing of the male member into the female member, and in the hurry and confusion of the moment at a fire the threads are very apt to become jammed so as to make the coupling of the two parts together a rather difficult and tedious operation.

By means of my invention it is possible to convert the ordinary couplings for hose, pipes, hydrants, nozzles, etc., into couplings which can be instantly coupled together.

It has been heretofore proposed to construct a coupling so that the two parts thereof can be coupled by a longitudinal movement of one with reference to the other and without the necessity of screw-threading one on to the other, but so far as I am aware all previous attempts to make a coupling in this way have resulted in a coupling in which either one or both of the members thereof have been especially constructed and in order to get the benefit of a coupling of this character, therefore, it has heretofore been necessary to discard entirely the old couplings now in use by fire departments on their hose, and in other relations, and to substitute therefore entirely new couplings. This obviously involves a considerable expense.

As stated above one object of my invention is to provide a novel attachment which can be used in connection with the ordinary coupling now in common use and which will convert it into a coupling capable of being connected simply by movement of the two parts longitudinally without the necessity of turning one on the other, and in the embodiment of my invention herein shown I accomplish this object by providing a novel attachment which is arranged to be screw-threaded to either the male or the female member of the coupling and to be permanently carried thereby, which attachment has a plurality of radially-yielding screw-threaded sections or blocks adapted to engage the screw threads of the other member, the manner of mounting these screw-threaded sections permitting the coupling to be united by a longitudinal movement of the members.

The other object of my invention, as stated above, is to provide two quick-acting coupling members of such a construction that when they are coupled together by a relative movement between them longitudinally thereof any strain tending to separate the coupling will result only in causing the yieldingly-mounted screw threaded blocks to be pressed harder against the screw-threads with which they engage. This object is accomplished by mounting said blocks in recesses having inclined walls, and making the blocks with faces to fit the inclined walls, the inclination of the walls being such that the pressure of the blocks against said walls results in forcing or pressing the blocks inwardly thereby causing them to more securely grip the other member of the coupling.

I will first describe one embodiment of my invention and then point out the novel features thereof in the appended claims.

In the drawings Figure 1 is a central section of a coupling having my attachment applied thereto; Fig. 2 is a horizontal section through the attachment on the line x—x, Fig. 1; Fig. 3 is a detail of the attachment showing the manner of holding the screw-threaded sections therein; Fig. 4 is a view of one of the sections removed; and Fig. 5 illustrates my invention as applied to coupling a nozzle to a fire hose.

In the drawings 3 and 4 designate the male and female members of an ordinary coupling, the male member having the exterior screw-threaded portion 5 adapted to screw into the interiorly-screw-threaded portion 6 of the female member. The screw threads 6 of the female member are formed on the swivel ring 7 which is swiveled to the male member, in any suitable way. As one convenient way of thus swiveling the ring 7 to the member 4, I have shown both the ring and the member as provided with alined grooves 8, 9 within which is received the split ring 10, said ring serving to hold the two parts together and yet permitting the ring 7 to be turned on the member 4.

The parts thus far described constitute the familiar parts of an ordinary coupling, such as is commonly used on fire hose, garden hose and for connecting pipes and conduits generally.

To connect a coupling thus constructed involves the screwing of the ring 7 on to the portion 5 and this obviously requires considerable time. For converting this form of coupling into a quick-acting coupling, I have provided the attachment which is permanently secured to either the male or the female member of the coupling and which is capable of being quickly coupled to the other member. In the present embodiment said attachment, which is designated generally by 11, is shown as screw-threaded to the female member of the coupling. The attachment comprises the exteriorly screw-threaded portion 12 adapted to be screwed into the ring 7, as shown, and the portion 13 adapted to be coupled to the exteriorly screw-threaded portion 5 of the male member of the coupling. The portion 13 of the attachment carries a plurality of radially-yielding blocks 14 each of which is provided with screw threads on its inner face, which screw threads are adapted to engage the screw threads of the male member 3. These blocks 14 may have any suitable shape or configuration, and any desired number of them may be employed. I have shown several such blocks each of which is substantially circular in cross section. These blocks are received in radially-extending apertures 15 in the attachment and are backed by a spring or springs which normally tend to force them inwardly. The apertures 15 are substantially circular in cross section to fit the cylindrical blocks and preferably will be formed at an angle or inclination, as best seen in Fig. 1, so that the walls 16 and 17 thereof incline with relation to the longitudinal axis of the coupling.

While any suitable yielding backing for the blocks may be employed, I propose to use one or more coiled springs 18 which extend around the member 13 and engage the back sides of the blocks 14. These springs form a very convenient resilient backing which permits any or all of the blocks to be moved radially as required.

In making the device the attachment 11 may have a circumferential groove 20 in which the springs 18 are received, said groove intersecting the apertures 15 in which the blocks 14 are received, as plainly seen in Fig. 3. For covering said springs and the groove 20 I have shown a ring 21 which surrounds the groove and which is frictionally held in place or which may be permanently secured to the attachment by screws or other means after the parts have been assembled.

In converting an ordinary coupling into a quick-acting one, it is simply necessary to screw thread my improved attachment 11 to the female member of the coupling, as shown in Fig. 1, and after this is done the male member may be coupled to the female member merely by moving the male member longitudinally of the attachment, for it will be obvious that during such longitudinal movement the blocks 14 will yield outwardly to permit the connection to be made. After the parts have been thus coupled, the coupling may be tightened by turning the ring 7 with the attachment slightly if such action is necessary.

It will be noted that the walls 16, 17, of the apertures 15 are inclined relative to the longitudinal axis of the coupling, and also that the block 14 is made with inclined sides that fit against the inclined walls 16, 17.

The object of making the apertures and the block 14 with inclined walls is to provide a construction which will prevent the two members 3 and 11 from being readily pulled apart after they have been coupled. With the construction shown it will be seen that when the two parts 3 and 11 are coupled together the forcing of the threaded portion 5 into the ring 13 results in crowding the blocks 14 outwardly against the action of the spring 18. After the parts are coupled any tendency to withdraw the member 3 will force the blocks 14 against the inclined wall 16, and the pressure of said blocks against said walls will cause the blocks to be forced inwardly firmly against the screw-threaded portion 5. With this construction, therefore, any tendency to pull the two members apart only results in causing the screw-threaded block 14 to more firmly grip the screw threads of the member 5.

It is not essential to my invention that the blocks 14 and apertures 15 have the shapes shown, for said blocks might have any desired shape without departing from the invention provided they were yieldingly mounted, and provided they had inclined faces to fit the inclined walls 16, 17, of the apertures receiving them.

For some reasons I prefer the shape shown in the drawings because said blocks 14 can be made from a round rod which is cut diagonally to give the shape of block shown, and the apertures 15 may be made by drilling into the member 11 at an inclination.

Where the blocks 14 are of the shape shown it is desirable to have some means for preventing their turning in the apertures 15, and to hold them in proper position I have provided each with the laterally extending lugs 25 which engage the side walls of the groove 20 as seen in Fig. 3. Furthermore, each block is shown as provided with a groove 23 in which the springs 18 are received.

From the above it will be seen that with my improved attachment any ordinary coupling can be converted into a quick-acting one. It will also be seen that the quick-acting feature of the coupling is of such a construction that after the parts are coupled together any strain tending to separate the coupling parts will only tend to cause the screw-threaded blocks 14 to more firmly grip the member 3.

My invention is not limited to the coupling of hose together as obviously it may be used in connection with couplings for connecting hose to hydrants, fire engines, and to other stationary devices, and may also be used in connection with any couplings for connecting any two elements together.

My invention is especially applicable however for coupling nozzles to fire hose, as shown in Fig. 5, wherein 41 designates a portion of fire hose having a female coupling 42 at one end, and 43 is an ordinary nozzle which is provided with the exteriorly screw-threaded male portion 44. 11 in said figure designates my improved attachment which is permanently secured to the female coupling member 42. When it is thus used the nozzle 43 can be instantly coupled with the hose by a longitudinal movement of the nozzle, as will be readily understood, and thus much valuable time may be saved at a fire.

The feature of my invention which relates to making the walls of the aperture 15 inclined so that the two members coupled together will be held in their coupled condition in spite of any strain tending to separate them may be applied to other devices than the special attachment herein shown.

I have not attempted to show herein all forms of my invention but have illustrated the invention by showing the preferred form only.

Having described my invention what I claim as new and desire to secure by Letters Patent is:—

1. An attachment for couplings presenting at one end an exteriorly screw-threaded member and at the other end a plurality of inclined radially-extending recesses, and blocks fitting said recesses and provided on their inner faces with screw-threads.

2. An attachment for couplings presenting at one end an exteriorly screw-threaded portion and at the other end a plurality of inclined radially-extending recesses, blocks in said recesses provided with screw-threads on their inner faces, and an endless coiled spring encircling the attachment and engaging the back sides of the blocks.

3. In a coupling, the combination with a male member provided with exterior screw threads, of a female member having an interior recess inclined with relation to the axis of the coupling, and a block fitting said recess yieldingly mounted therein and provided with screw threads to engage those on the male member.

4. In a coupling, the combination with a male and a female member, one of said members having a recess, of a block yieldingly carried in said recess and sustained for movement outwardly in a direction inclined to the axis of the coupling, said block having screw threads to engage the screw threads on the other member.

5. In a coupling, the combination with a male member provided with exterior screw threads, of a female member having an interior recess provided on opposite sides with walls inclined in the same direction, and a block yieldingly mounted in said recess, said block having beveled sides to engage the beveled walls of the recess and also having screw threads to engage the screw threads on the male member.

In testimony whereof, I have signed my name to this specification, in the presence of two subscribing witnesses.

ROLAND C. HILTON.

Witnesses:
  LOUIS C. SMITH,
  MARGARET A. DUNN.